UNITED STATES PATENT OFFICE.

WILLIAM GRISCOM, JR., OF BOUND BROOK, NEW JERSEY, ASSIGNOR TO THE STANDARD PAINT COMPANY, OF NEW YORK, N. Y.

PAINTING COMPOUND.

SPECIFICATION forming part of Letters Patent No. 529,729, dated November 27, 1894.

Application filed March 11, 1891. Serial No. 384,648. (No specimens.)

*To all whom it may concern:*

Be it known that I, WILLIAM GRISCOM, Jr., of Bound Brook, in the county of Somerset and State of New Jersey, have invented certain new and useful Improvements in Painting Compounds; and I do hereby declare that the following specification is a clear, true, and complete description of my invention.

The object of my invention, is the production of a line of comparatively inexpensive paints, specially adapted for durable, and reliable use, in all connections, wherein the exclusion or retention of moisture, or water, is involved, as for packing cases, sheeted fabrics, roofing, ships' bottoms, and tank lining, as well as for insulation, both electric and thermal.

The main element, or body, in my novel painting compound, essentially consists of an elastic vulcanized mass, containing animal fat candle tar, and a suitable solvent, or vehicle. The said vulcanized mass, may be either composed solely of animal fat candle tar, and sulphur, or of those bodies, combined with other such plastic matter as the residual products from the distillation of petroleum. For the purposes of this specification, it will be deemed sufficient to state, that such vulcanized compounds, are believed by me to be novel, and of my own invention, and that they have been made the subjects of other applications for Letters Patent. (See Serial Nos. 384,643 and 384,644, filed March 11, 1891.) It may, however, be proper to further state, that the candle tar referred to is a residuum from the distillation of animal oils, fats, &c., and that it is known under various names, and although quite variable in character, the several names have been applied thereto, without reference to physical variations. Some of said candle tars, are normally hard, solid, and even friable at say 64° temperature; and others grade downwardly so that some of them are normally soft, viscous, and ropy, even at temperatures below 64° Fahrenheit. This latter type should be used, with a view to attaining the best results, but any and all of the other types of animal fat candle tar may be employed, without departure from my present invention, and with valuable results.

The vulcanizing of animal fat candle tar, may be well accomplished by heating said candle tar to a high degree of liquefaction, and combining therewith, melted sulphur in proportion—say of from one to three parts, to each sixteen parts of said candle tar; but it is to be understood that sulphur may be employed to quite an indefinite extent, inasmuch as only a portion thereof would be actually needed, and the remainder would involve mere surplusage, which as usual in most connections, may well be avoided. The mass thus mixed, is slowly raised in temperature to from say 300° to 325° Fahrenheit, and after so maintaining it for from thirty minutes to an hour, it is allowed to cool. The resultant, will be a more or less honey combed mass of elastic matter. Variations in compounding and vulcanizing said candle tar, or in compounding it with the vehicle, will involve no departure from my present invention, which, broadly stated, includes any suitable solvent or vehicle, and elastic vulcanized animal fat candle tar. It also includes with a similar solvent or solvents, vulcanized compounds, in which such candle tar is an essential, or ruling element; as, for instance, that described in my said application, Serial No. 384,644, which includes as an ingredient, a residuum from the distillation of petroleum, and preferably that quite solid type thereof, which is normally hard and frequently friable at and below a temperature of say 70° Fahrenheit. Suitable vulcanized compounds, may be produced by the use of from ten, to fifty per cent. of the petroleum product, with the candle tar and sulphur, the latter ranging say from five to fifteen per cent. of the mass, the mixing and vulcanizing being substantially as before described, except that somewhat higher temperatures may well be employed, as, for instance, at say 380° or 390° Fahrenheit. This resultant, is quite close grained, or solid, and quite elastic and tenacious. These elastic vulcanized compounds are preferably developed in bulk form, then properly disintegrated, or cut up into small pieces, and then combined with a suitable solvent, but inasmuch as at the close of the vulcanizing process, the elastic mass is hot, and more or less soft or liquefied, it can at once be combined with the solvent.

When the cold or hardened vulcanized compound is used, it is quite finely divided, and to each four pounds thereof, I add about one half gallon of the light oil derived from coal tar, the whole being within a strong tight or closed digester provided with a mechanically operated agitator, and a steam jacket. The mass is then heated to a degree afforded by steam usually at about sixty-five pounds pressure. As a rule, about one hour of heating and agitation, will secure a perfectly formed solution, which after it has cooled, is drawn off into suitable storage vessels. This mode of operation, is deemed preferable to combining the initially vulcanized soft plastic mass with the solvent, but in both cases, the digester, with heat and agitation will be necessary. The light oils from coal tar are preferred as the vehicle for my paints, although the heavy oils from coal tar may be used, or benzole, and the naphthas, as well as bi-sulphide of carbon. The elastic vulcanized compound which contains only the said candle tar, and sulphur, affords a high and specially valuable grade of paint, but a cheaper, although very desirable grade, is afforded by the use of the compound which also contains the petroleum residuum. It is to be understood, that the elastic compound of animal fat candle tar and sulphur, constitutes the ruling element, and it is upon that element that I rely, for those durably elastic properties, which impart to my paint, one of its greatest values, and that the addition thereto of the other plastic matters, involves economy, with for some purposes greater efficiency. It is also to be understood, that the vulcanized elastic compound of animal fat candle tar and sulphur, may be used with the other plastic matters whether the latter be also vulcanized therewith, or added during the forming of the paint.

Having thus described my invention, I claim as new and desire to secure by Letters Patent—

1. A painting compound, composed of an elastic vulcanized compound of animal fat candle tar and sulphur, and a suitable solvent or vehicle.

2. In a painting compound, elastic vulcanized animal fat candle tar, as an essential element, combined with such plastic matter as the residual products from petroleum distillation, and a suitable solvent or vehicle.

WILLIAM GRISCOM, JR.

Witnesses:
PHILIP F. LARNER,
HOWELL BARTLE.